United States Patent
Chou et al.

(10) Patent No.: US 7,117,589 B2
(45) Date of Patent: Oct. 10, 2006

(54) METHOD OF INSTALLING A PLUG AND PLAY DEVICE DRIVER

(75) Inventors: Wen-Hwa Chou, Taipei (TW); Yun-Kuo Lee, Hsinchu (TW)

(73) Assignee: Prolific Technology Inc., Taipei (TW)

( * ) Notice: Subject to any disclaimer, the term of this patent is extended or adjusted under 35 U.S.C. 154(b) by 461 days.

(21) Appl. No.: 10/425,873

(22) Filed: Apr. 30, 2003

(65) Prior Publication Data

US 2003/0204950 A1 Nov. 6, 2003

(30) Foreign Application Priority Data

May 1, 2002 (TW) ............................... 91109097 A

(51) Int. Cl.
*H05K 3/30* (2006.01)
(52) U.S. Cl. .................. 29/832; 29/739; 29/740; 710/8; 710/10; 710/13; 710/104; 713/1; 713/2
(58) Field of Classification Search .................. 29/739, 29/740, 832; 710/8–19, 104; 713/1–2, 100
See application file for complete search history.

(56) References Cited

U.S. PATENT DOCUMENTS 6,981,080 B1 * 12/2005 Thompson et al. ......... 710/104

FOREIGN PATENT DOCUMENTS

| CN | 1247346 | 3/2000 |
|----|---------|--------|
| CN | 1380603 | 11/2002 |

* cited by examiner

*Primary Examiner*—Richard Chang
(74) *Attorney, Agent, or Firm*—Rabin & Berdo, P.C.

(57) ABSTRACT

A method of installing a driver for a plug and play device is provided, wherein the plug and play device includes a main function device and a storage device meeting a standard specification. The storage device stores a driver required by the main function device. The main function device and storage device may be connected to the host in two different ways after the plug and play device is installed to the host. The first way is to connect the two devices to the host simultaneously. The host loads a built-in standard driver for the storage device from the host to access the storage device, and then loads the driver required by the main function device from the storage device to gain freely access to the main function device. The second way is to connect the storage device to the host, and to cause the host to copy the main function device driver from the storage device to the host's storage device (e.g., a disk drive). Next, the main function device is connected to the host. At this time, the host can directly load the copied driver for the main function device and retrieve the device accordingly.

24 Claims, 1 Drawing Sheet

METHOD OF INSTALLING A PLUG AND PLAY DEVICE DRIVER

This application claims the benefit of Taiwan application Serial No. 91109097, filed on May 1, 2002.

BACKGROUND OF THE INVENTION

1. Field of the Invention

The invention relates to a method of installing a driver, and more particularly to a method of installing a driver for a plug and play (PNP) device.

2. Description of the Related Art

The computer industry has seen a great deal of progress. In order to let peripheral devices be easily connected, PNP peripherals play important roles. Almost all hardware devices (e.g., printers, scanners, modems, and display cards) have a PNP configuration. Most peripherals are not standard devices automatically supported by the host. Hardware devices sold to users must include drivers stored on optical or magnetic disks that users can install in order to be able to use their hardware devices. During the installation, the user has to instruct the host to retrieve the driver that is stored on the optical diskto complete. The installation of the PNP device is convenient when used with a driver stored on optical or magnetic disks, but the hardware device will not work if the driver disk is lost. For example, the trend of users assembling their own computer is growing, and the operation system (OS) of a host may be changed frequently. When the operation system is changed, the drivers for each peripheral device have to be reinstalled. If the disk containing the driver is lost, the hardware will not. The user may back up all of the drivers for all the hardware devices on the hard disk, but this may take up a large amount of hard disk space and cannot be considered a proper storage method.

SUMMARY OF THE INVENTION

In view of the above-mentioned problems, an objective of the invention is to provide a method of installing a driver for a PNP device, in which the built-in driver of the PNP device may be accessed by the host. This makes it convenient for the host to load the PNP device driver, and increases the convenience of the PNP device accordingly.

The invention achieves the above-identified objective by providing a method of installing a driver for a PNP device, and the method is described in the following.

The PNP device includes a main function device and a storage device compliant with standard specifications. The storage device stores a driver required by the main function device. Since the storage device meets the standard specification and can be directly supported by the host, the host is able to read the main function device driver stored in the storage device by using the standard storage device driver. Thus, after the PNP device is installed in the host, the host can use the previously stored driver of the main function device to install the main function device smoothly.

The main function device and the storage device may be connected to the host in two ways. The first way is to connect the two devices to the host simultaneously. The host loads a built-in standard driver for the storage device so as to access the storage device. Then, the host loads the driver from the storage device, which is required by the main function device, so that the host may freely retrieve the main function device. The second way is to first connect the storage device to the host. The host copies the driver of the main function device from the storage device, to the host's storage device (e.g., a disk drive). Next, the main function device is connected to the host. At this time, the host can directly load the copied driver for the main function device and retrieve the device accordingly.

Other objectives, features, and advantages of the invention will become apparent from the following detailed description of the preferred but non-limiting embodiments. The following description is made with reference to the accompanying drawings.

DETAILED DESCRIPTION OF THE INVENTION

Figures 1, 2, 3:
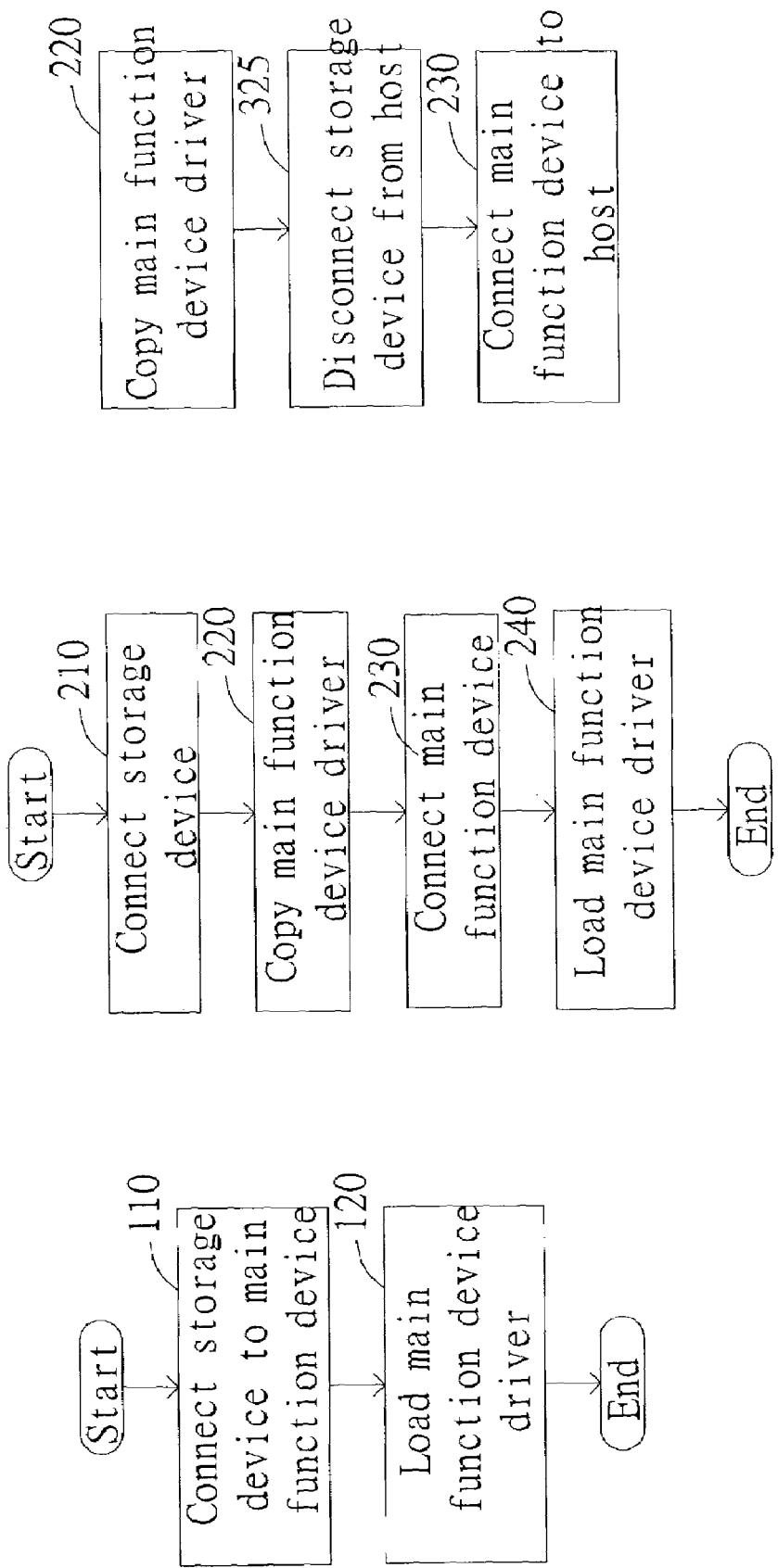
FIG. 1 is a flow chart showing a method of installing a driver for a PNP device according to a first embodiment of the invention.
FIG. 2 is a flow chart showing a method of installing a driver for a PNP device according to a second embodiment of the invention.
FIG. 3 shows the procedures for connecting/disconnecting the storage device and modem of the invention.

In order for the host to automatically install the required driver upon connection to the PNP device and the host, without using an additional driver stored in the optical or magnetic disk, the method of the invention is to build the desired driver for the PNP device into the device so that the host loads the built-in driver to control the PNP device after the host has recognized the PNP device. In the following, the PNP modem serves as an example of the PNP device to facilitate the description of the method for installing the driver of the invention.

There are several modem manufacturers, and each modem has its own characteristics. Thus, a specific driver suitable for each modem has to be developed so as to control the specific functions of the modem. In order to build the driver into the modem, it is possible to provide a storage device compliant with a standard specification in the modem and to store the driver inside that storage device. The standard specification may be, for example, a USB (Universal Serial Bus) MSC (Mass Storage Class) specification. For example, a memory that meets the USB MSC specification is provided in the modem, to store the desired driver. The PNP modem may include a storage device compliant with the standard specification and a main function device. The main function device implements all the functions of the modem, while the storage device stores the required driver for the main function device.

FIG. 1 is a flow chart showing a method of installing a driver for a PNP device according to a first embodiment of the invention. After the modem is connected to the host, the modem simultaneously connects a storage device meeting standard specifications and a main function device to the host, as indicated in step 110. At this time, the host regards the modem as a multi-function device and begins to install the two devices. The host can utilize the standard storage device driver to install the storage device. Then, after the installation of the storage device is finished, the host can load the main function device driver, which was previously stored in the storage device to complete the installation of the main function device, as shown in step 120.

FIG. 2 is a flow chart showing a method of installing a driver for a PNP device according to a second embodiment of the invention. After the modem is connected to the host, a standard storage device meeting a standard specification is connected to the host, as indicated in step 210. Since the modem driver has been stored in the standard storage device, the host can retrieve the modem driver using a standard storage device driver and then copy the modem driver, as shown in step 220. After the host has copied the modem driver, the main function device of the modem is connected to the host in step 230. In step 240, the host then loads the copied modem driver and finishes the modem installation.

FIG. 3 shows the procedures for connecting/disconnecting the storage device and modem of the invention. As mentioned above, after the modem is connected to the host, the standard storage device compliant with a standard specification is connected to the host. After the host has copied the driver from the storage device, the main function device is connected to the host so that the host can continue the installation according to the copied driver. More specifically, as indicated in step 325, after the host has copied the driver, the host and storage device are disconnected and then the host and the main function device are connected. At this time, the modem, that is, the main function device, is connected to the host. Since the host possesses the modem driver, the host can install the driver to control the modem. It should be noted that the connect/disconnect relationship between the host and the modem can be changed by adjusting the voltage levels of some signals on a signal cable. That is, connecting the modem to the host or disconnecting the modem from the host can be achieved by adjusting the level of the signal voltage without pulling out or physically reconnecting the signal cable.

It should be noted that the PNP device in the above-mentioned embodiments may be a modem, a printer, a scanner, or any other hardware device that meets the PNP interface standard, such as universal serial bus (USB), IEEE 1394, peripheral component interconnect (PCI), personal computer memory card international association (PCMCIA), and Compact Flash interfaces specifications, and such a PNP device is applicable to the method of installing a driver embodied in the invention.

The method of installing a driver for a PNP device according to the embodiments of the invention can effectively solve the problem of losing hardware device drivers. In addition, an optical or magnetic disk is not needed to install the hardware devices. Thus, the hardware installation is more convenient and efficient.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of installing a driver for a plug and play device into a host to which the plug and play device is connected, the method comprising the steps of:
   (a) connecting the plug and play device to the host, wherein the plug and play device comprises a main function device and a storage device compliant with a standard specification, a driver for the main function device being stored in the storage device, the step (a) comprising:
   connecting both the storage device and the main function device to the host so that the host regards the plug and play device as a multi-function device and begins to install the storage device and the main function device, wherein the host installs the storage device first since the storage device is compliant with the standard specification; and
   (b) after the installation of the storage device, causing the host to load the driver for the main function device from the storage device so as to install the main function device.

2. The method according to claim 1, wherein the plug and play device meets a universal serial bus (USB) interface specification.

3. The method according to claim 2, wherein the standard specification is a USB mass storage class (MSC) specification.

4. The method according to claim 1, wherein the plug and play device meets an IEEE 1394 interface specification.

5. The method according to claim 1, wherein the plug and play device meets a peripheral component interconnect (PCI) interface specification.

6. The method according to claim 1, wherein the plug and play device meets a Personal Computer Memory Card International Association (PCMCIA) interface specification.

7. The method according to claim 1, wherein the plug and play device meets a Compact Flash interface specification.

8. A method of installing a driver for a plug and play device into a host to which the plug and play device is connected, the method comprising the steps of:
   (a) connecting the plug and play device to the host, wherein the plug and play device comprises a main function device and a storage device compliant with a standard specification, a driver for the main function device is being stored in the storage device, the step (a) comprising the steps of:
   connecting the storage device to the host so that the host installs the storage device since the storage device is compliant with the standard specification; and
   causing the host to copy the driver from the storage device after the installation of the storage device; and
   (b) after the copying of the driver, disconnecting the storage device from the host and then connecting the main function device to the host so as to cause the host to load the driver copied from the storage device and to install the main function device.

9. The method according to claim 8, wherein the plug and play device meets a universal serial bus (USB) interface specification.

10. The method according to claim 9, wherein the standard specification is a USB mass storage class specification.

11. The method according to claim 8, wherein the plug and play device meets an IEEE 1394 interface specification.

12. The method according to claim 8, wherein the plug and play device meets a peripheral component interconnect (PCI) interface specification.

13. The method according to claim 8, wherein the plug and play device meets a universal serial bus (USB) specification.

14. The method according to claim 8, wherein the plug and play device meets a Personal Computer Memory Card International Association (PCMCIA) interface specification.

15. The method according to claim 8, wherein the plug and play device meets a Compact Flash interface specification.

16. A method of installing a driver for a plug and play device into a host, the method comprising the steps of:
   connecting the plug and play device to the host, wherein the plug and play device comprises a main function device and a storage device compliant with a standard specification, a driver for the main function device being stored in the storage device; and initiating the host to load the driver from the storage device;

wherein the step of connecting the plug and play device to the host comprises the steps of:

(a) connecting the storage device to the host;
(b) causing the host to copy the driver from the storage device; and
(c) connecting the main function device to the host, wherein the storage device is connected to the host by a signal cable, and the method further comprises, between said steps (b) and (c), the step of:
(d) disconnecting the storage device from the host and then connecting the main function device to the host.

17. The method according to claim 16, wherein said step (d) is performed by adjusting voltage levels on the signal cable to simulate disconnecting and connecting.

18. The method according to claim 16, wherein the plug and play device meets a universal serial bus (USB) interface specification.

19. The method according to claim 18, wherein the standard specification is a USB mass storage class specification.

20. The method according to claim 16, wherein the plug and play device meets an IEEE 1394 interface specification.

21. The method according to claim 16, wherein the plug and play device meets a peripheral component interconnect (PCI) interface specification.

22. The method according to claim 16, wherein the plug and play device meets a universal serial bus (USB) specification.

23. The method according to claim 16, wherein the plug and play device meets a Personal Computer Memory Card International Association (PCMCIA) interface specification.

24. The method according to claim 16, wherein the plug and play device meets the Compact Flash interface specification.

* * * * *